US008260941B2

(12) United States Patent
Danforth et al.

(10) Patent No.: US 8,260,941 B2
(45) Date of Patent: Sep. 4, 2012

(54) SYSTEM AND METHOD FOR DETECTING AND REPORTING CABLE MODEMS WITH DUPLICATE MEDIA ACCESS CONTROL ADDRESSES

(75) Inventors: Andrew Danforth, Herndon, VA (US); Kenneth Gould, Oakton, VA (US); Christopher Williams, Potomac Falls, VA (US)

(73) Assignee: Time Warner Cable, Inc., New York, NY (US)

( * ) Notice: Subject to any disclaimer, the term of this patent is extended or adjusted under 35 U.S.C. 154(b) by 814 days.

(21) Appl. No.: 11/856,474

(22) Filed: Sep. 17, 2007

(65) Prior Publication Data
US 2008/0109864 A1 May 8, 2008

Related U.S. Application Data

(63) Continuation-in-part of application No. 10/325,269, filed on Dec. 20, 2002, now Pat. No. 7,272,846.

(51) Int. Cl.
G06F 15/16 (2006.01)
(52) U.S. Cl. .................... 709/229; 709/217; 709/219
(58) Field of Classification Search .......... 709/225, 709/227–229, 232–235, 217–219; 725/111
See application file for complete search history.

(56) References Cited

U.S. PATENT DOCUMENTS

| 5,400,402 | A | * | 3/1995 | Garfinkle ............... 380/231 |
| 5,467,382 | A | | 11/1995 | Schorman |
| 5,724,510 | A | | 3/1998 | Arndt et al. |
| 5,884,024 | A | * | 3/1999 | Lim et al. ................ 726/3 |
| 6,195,689 | B1 | | 2/2001 | Bahlmann |
| 6,393,484 | B1 | | 5/2002 | Massarani |
| 6,493,340 | B1 | | 12/2002 | Kawanaka |
| 6,603,758 | B1 | * | 8/2003 | Schmuelling et al. ........ 370/352 |
| 6,697,862 | B1 | | 2/2004 | Beser et al. |
| 6,745,333 | B1 | | 6/2004 | Thomsen |
| 6,859,826 | B2 | | 2/2005 | Bahlmann |
| 6,938,077 | B2 | * | 8/2005 | Sanders ................ 709/219 |
| 7,512,969 | B2 | * | 3/2009 | Gould et al. .............. 726/4 |
| 7,668,195 | B2 | * | 2/2010 | Stone ................... 370/465 |
| 2002/0023160 | A1 | | 2/2002 | Garrett et al. |
| 2002/0023174 | A1 | | 2/2002 | Garrett et al. |
| 2002/0165972 | A1 | | 11/2002 | Chien et al. |
| 2004/0103314 | A1 | | 5/2004 | Liston |
| 2005/0114880 | A1 | * | 5/2005 | Gould ................... 725/25 |
| 2006/0075103 | A1 | * | 4/2006 | Cromer et al. ............. 709/225 |

(Continued)

OTHER PUBLICATIONS

Droms, "RFC 2131: Dynamic Host Configuration Protocol," Mar. 1997, http://www.ietf.org/rfc/rfc2131.txt?number=2131.
Staniford et al., "How to Own the Internet in Your Spare Time," Proceedings of the 11th USENIX Security Symposium (Security '02) Aug. 8, 2002.

Primary Examiner — Emmanuel L Moise
Assistant Examiner — Edward Kim
(74) Attorney, Agent, or Firm — The Marbury Law Group, PLLC

(57) ABSTRACT

The detection of devices with duplicate media access controller (MAC) addresses in a cable network may be accomplished by reference to a value indicative of a DOCSIS version supported by the device or by reference to a having a MAC address/giaddr pair. Where a version value is used, the detection of devices having duplicate MAC addresses looks for changes in the reported version value from a higher version to a lower version. Where MAC address/giaddr pairs are used, a centralized storage of historical cable modem MAC address/giaddr pair data is used to identify cable modems (CM's) that report duplicate MAC addresses. If duplication is detected, an appropriate remedial response is taken.

8 Claims, 6 Drawing Sheets

U.S. PATENT DOCUMENTS

2006/0280197 A1* 12/2006 Stone .......................... 370/437
2007/0220571 A1* 9/2007 Feng et al. .................... 725/111
2007/0276943 A1* 11/2007 Marez et al. .................. 709/225
2008/0109864 A1* 5/2008 Danforth et al. .............. 725/111

* cited by examiner

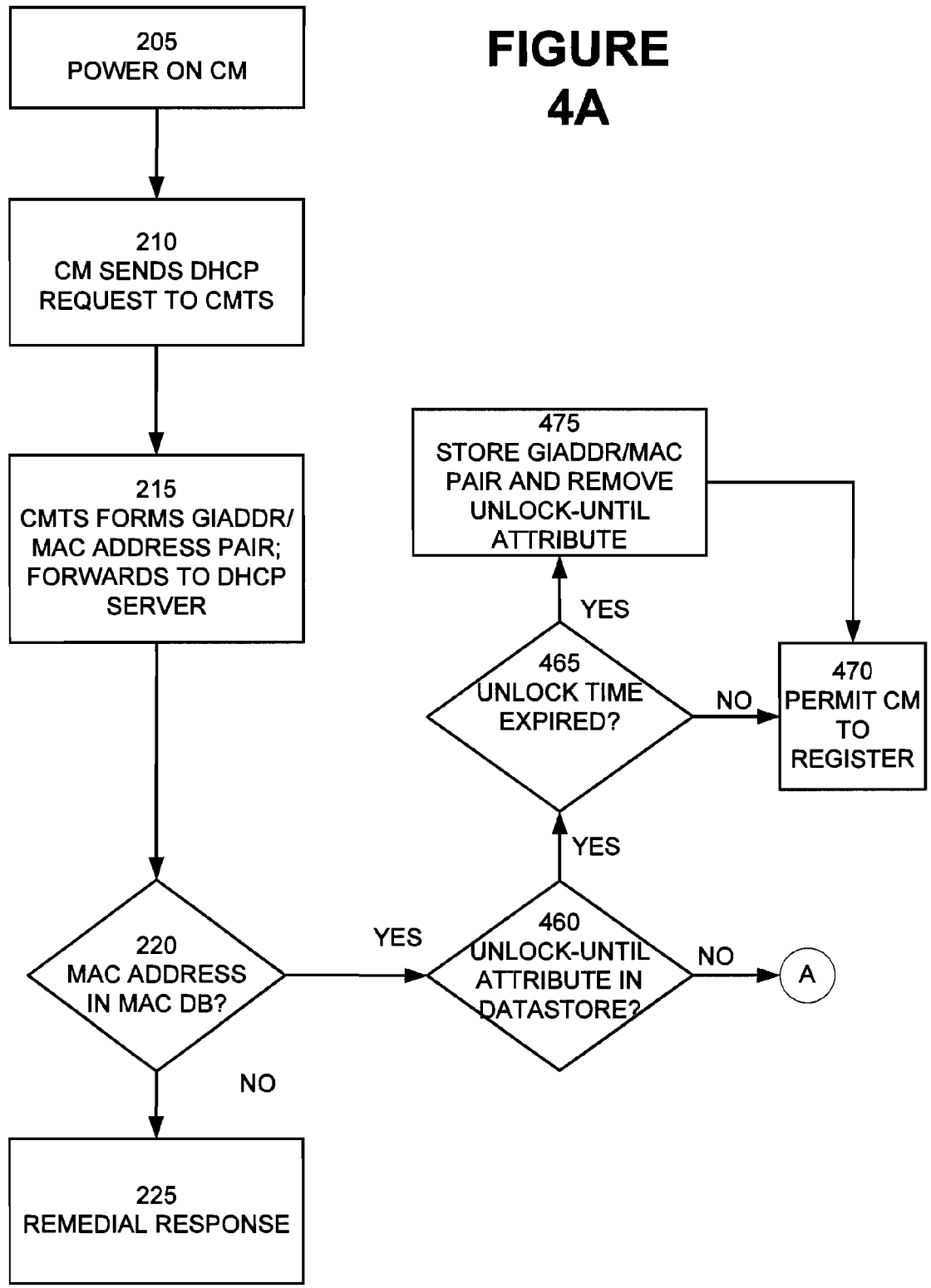

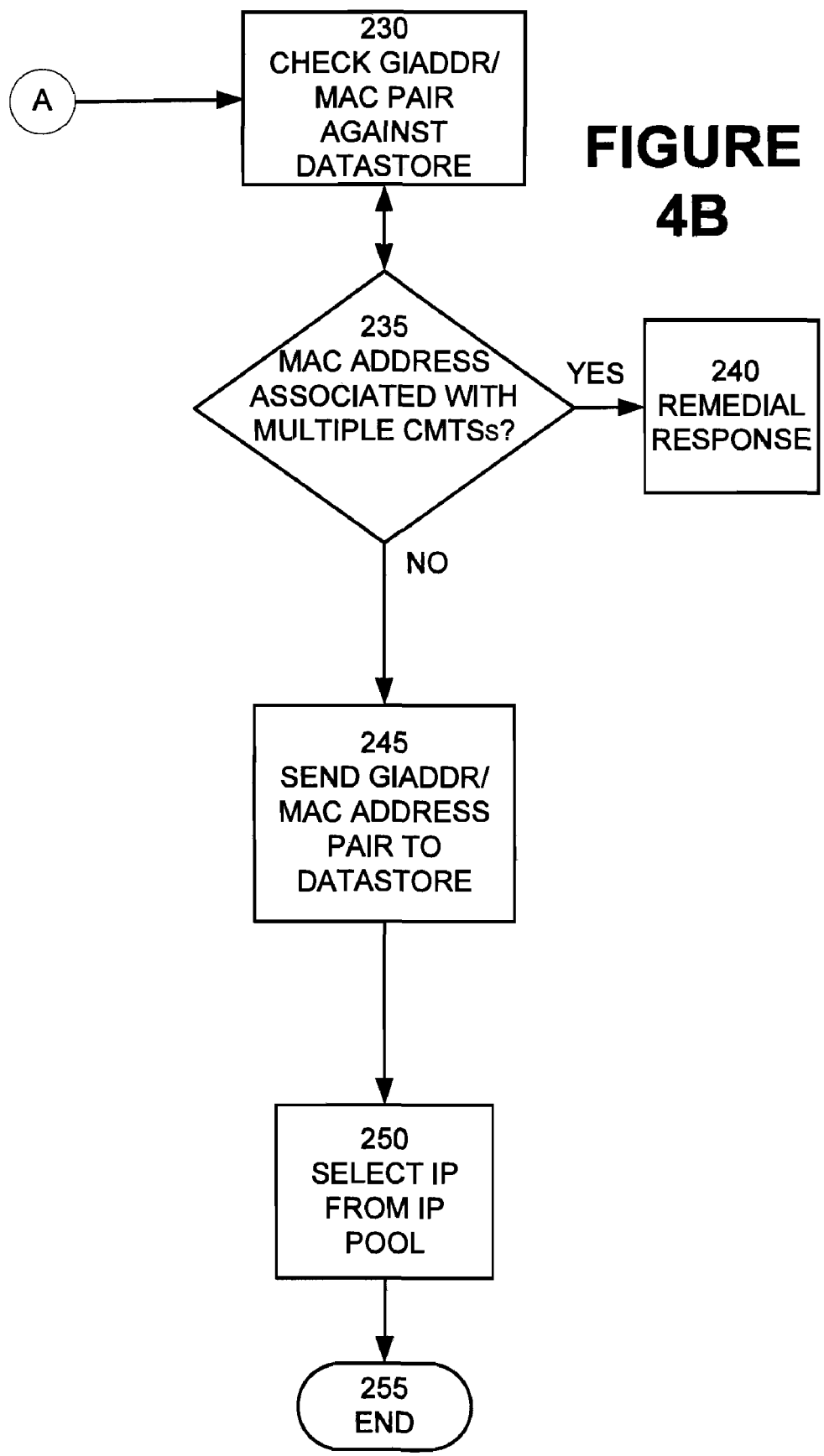

SYSTEM AND METHOD FOR DETECTING AND REPORTING CABLE MODEMS WITH DUPLICATE MEDIA ACCESS CONTROL ADDRESSES

CROSS REFERENCE TO RELATED APPLICATIONS

This application is a continuation in part of application Ser. No. 10/325,269 filed Dec. 20, 2002, now U.S. Pat. 7,272,846. The 10/325,269 application is incorporated by reference herein, in its entirety, for all purposes.

SUMMARY AND BACKGROUND OF INVENTION

Every network interface has a media access controller (MAC) address, also known as the physical address. This is the actual hardware address that the lowest level of the network uses to communicate. The MAC address is used to assign the IP address to a device by means of a dynamic host configuration protocol (DHCP) server.

The MAC address is theoretically unique to a particular device. This permits an IP network service provider to use the MAC address as a vehicle for authorizing access to its network and further aids in billing users for services. In the cable environment, access to the cable network's data service is provided through a cable modem (CM). Increasingly, CMs are required to comply with an industry standard referred to as the "Data Over Cable Service Interface Specification" or DOCSIS. DOCSIS provides a set of standards and a certifying authority by which cable companies can achieve cross-platform functionality in Internet delivery. A DOCSIS compliant cable network comprises cable modem termination systems (CMTSs) and cable modems that form the interface to an Internet service provider (ISP). The CM modem provides two-way connectivity between a customer and the ISP through the CMTS. A cable modem termination system (CMTS) is a component that exchanges digital signals with cable modems on a cable network.

A data service is delivered to a subscriber through channels in a coaxial cable to a CM. An upstream channel is used to communicate from the CM to the CMTS. A downstream channel handles communication from the CMTS to the CM. When a CMTS receives signals from the CM, the CMTS converts these signals into Internet Protocol (IP) packets, which are then sent to an IP router for transmission across the Internet or service provider network. When a CMTS sends signals to a cable modem, the CMTS modulates the downstream signals for transmission across the cable to the cable modem.

Ideally, at the time of manufacture a CM is assigned a MAC address that uniquely identifies that cable modem. Either through error at the time of manufacture, or through malicious intent (hacking), a cable modem may appear on a cable network with a MAC address that has already been assigned to another cable modem. As the MAC address is often the sole identifier used to identify and authenticate a cable modem in order to provide cable modem network connectivity and for billing purposes, it is imperative to guarantee the uniqueness of the MAC address for each cable modem in order to thwart "theft of services."

The DHCP server uses the CM MAC address to determine whether a customer should receive cable modem service (based on finding the MAC address in a provisioning/authentication database) and what kind of service should be received. If a "rogue" cable modem were to share the same MAC address as a legitimate cable modem, the "rogue" would receive the same level of service as the legitimate CM. If the legitimate cable modem user is charged for service based upon the quantity of service used, it is likely that the legitimate user will be charged for the bandwidth consumed by the "rogue" CM that shares the same MAC address.

Typically, when a CM is connected to a cable network and powered on, the CM issues a DHCP request message requesting that an IP address be assigned to that CM. The DHCP request message contains the CM's MAC address. The CMTS receives the DHCP request and adds its own unique identifier (typically referred to as a gateway interface address or "giaddr") to the DHCP request. The giaddr identifies the CMTS through which the CM is communicating and is used by the DHCP server to determine from which pool of IP addresses a specific IP address for the CM will be selected. Thus, the intended function of the giaddr is to aid in the assignment of IP addresses.

In some cable systems, the CMTS will have a look-up table of CM MAC addresses and logic to deny access to a CM when the MAC address is not in the look-up table. Additionally, this type of CMTS may also reject the second occurrence of a MAC address presented to it. (In such cable systems, the CM "registers" with the CMTS so that only one CM with a specific MAC address may be connected at any one time.) However, even in configurations where the CMTS accesses MAC data, the CMTS is not able to discern whether the CM that presented the first MAC address to the CMTS was the legitimate CM or a user of an unauthorized a cable modem that is not entitled to receive service from the cable operator. Further, the CMTS has no way of knowing whether a CM's MAC address is being used on another CMTS.

DOCSIS 1.1 includes a host of new security related specifications based upon lessons learned from DOCSIS 1.0. The new addition related to CM provisioning is that each modem must contain a PKI certificate signed by the manufacturer which is presented to the CMTS during registration. The certificate contains the MAC address of the modem, thus allowing the CMTS to verify a modem is using the correct MAC address by comparing the MAC embedded within the certificate with the MAC in use. As the certificate is cryptographically signed by the manufacturer it cannot be changed by an end user.

This solution prevents DOCSIS 1.1+modems from functioning when only their MAC addresses have been changed. A vulnerability remains in the case where someone with physical access to two modems is capable of extracting the MAC and certificate from the first modem and then writing them to the second. In this case, the clone would be allowed on the network as the MAC and certificate would both match.

Unfortunately, in DOCSIS 1.0, the CM MAC address is the only identifier available when determining how to provision a CM during registration. Modified CM firmware has been released which allows end users to change the MAC address of their cable modem. This allows the modified modem to impersonate a legitimate provisioned modem on the DOCSIS network and receive HSD service for free.

What is needed is a means for identifying network devices having the same MAC address.

An embodiment provides a method for detecting multiple cable modems on a cable modem network that have the same MAC address. The MAC address of a cable modem is associated with the giaddr of the CMTS to which the cable modem is connected to form a MAC address/giaddr pair. A datastore stores historical MAC address/giaddr pair data. In one embodiment, that datastore comprises a central database. In an alternative embodiment, the datastore comprises a distributed database. By comparing the MAC address/giaddr pair data of a cable modem seeking to access a cable network to the MAC address/giaddr pair data in the datastore, duplicate MAC addresses can be detected and managed.

In another embodiment, during registration of a CM, the DHCP server parses the DHCP request from the CM for a value indicative of the DOCSIS version supported by the CM. The DHCP server also determines whether a CM version value has been stored in the DHCP datastore. If DOCSIS version value is not populated, DHCP will allow the CM online and update DHCP datastore to contain the DOCSIS version value provided by the CM. Thereafter, during each CM provisioning attempt, the DHCP will compare a DOCSIS version value provided by the CM against a DOCSIS version value retrieved from the datastore. When the stored DOCSIS version value is less than the CM-provided value, the CM will be allowed online and stored value will be updated to contain the higher DOCSIS version. However, if the stored DOCSIS version value is higher than the CM-provided value, and the CM only supports DOCSIS 1.0, the CM will be denied access to the network.

DESCRIPTION OF THE DRAWINGS

FIGS. 4A and 4B illustrate a process by which duplicated MAC addresses are detected in a single network with a plurality of CMTSs according to an embodiment.

DETAILED DESCRIPTION

Figure 1:
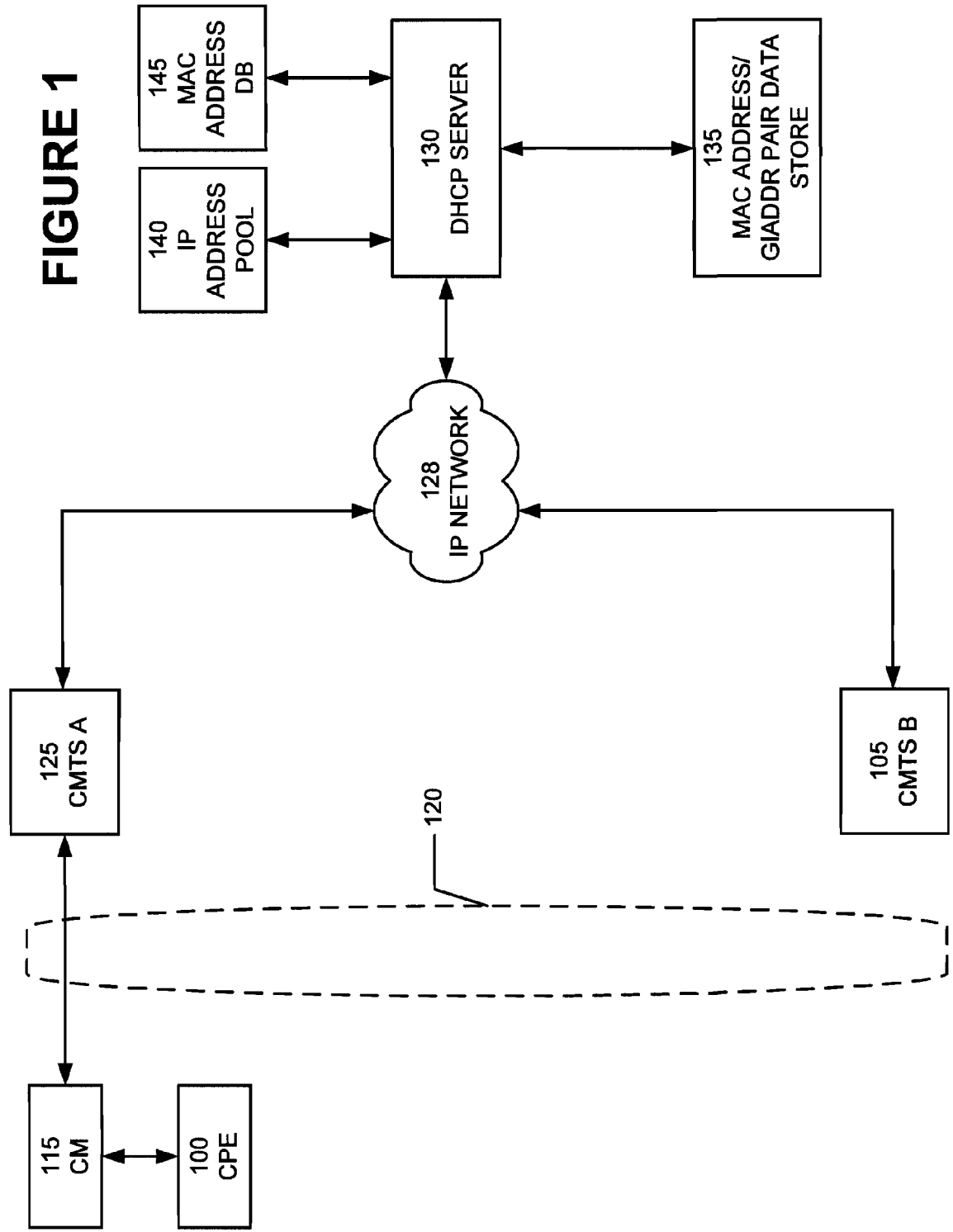
FIG. 1 illustrates an embodiment in which duplicated MAC addresses are detected in a single network with a plurality of CMTSs.

An embodiment is a method for detecting multiple cable modems on a cable modem network that have the same MAC address. Referring to FIG. 1, a block diagram of a cable network is illustrated. Customer premises equipment (CPE) 100 is connected to cable modem (CM) 115 that in turn interfaces to cable network 120. Cable network 120 terminates at multiple cable modem termination systems (each a CMTS) 125. A CM is identifiable on the network by a unique MAC address assigned to the CM at the time of manufacture. A CMTS is identified by a gateway interface address (a "giaddr"). Each CMTS 125 interfaces with an IP network 128. Connected to IP network 128 are DHCP server 130 and a datastore 135. Datastore 135 stores MAC address/giaddr pair data of CMs that have been authorized to access cable network 120.

An embodiment is a method for detecting multiple cable modems on a cable modem network that have the same MAC address. FIG. 1 is a block diagram illustrating an embodiment in which duplicated MAC addresses are detected in a single network with a plurality of CMTSs. Referring to FIG. 1, customer premises equipment (CPE) 100 is connected to cable modem (CM) 115 that in turn interfaces to cable network 120. CM 115 connects to cable modem termination system (CMTS) A 125 via cable network 120. Cable network 120 also terminates at CMTS B 105 so that a Cable network 120 terminates at multiple cable modem termination systems.

A CM is identifiable on the network by a unique MAC address assigned to the CM at the time of manufacture. A CMTS is identified by a gateway interface address (a "giaddr"). Both CMTS A 125 and CMTS B 105 interface with an IP network 128. Connected to IP network 128 are DHCP server 130 and a datastore 135. Datastore 135 stores MAC address/giaddr pair data of CMs that have been authorized to access cable network 120.

Additionally, the DHCP server 130 is connected to IP address pool 140 and MAC address database 145. In an embodiment, the MAC address database is created when a CM is assigned to a subscriber of IP service from the operator of cable network 120. The DHCP server 130 selects an IP address for the CM 115 based on the CMTS A 125 that the CM 115 uses for its network connection. A CMTS A 125 is identified to DHCP server 130 by the giaddr of the CMTS.

Figure 2:
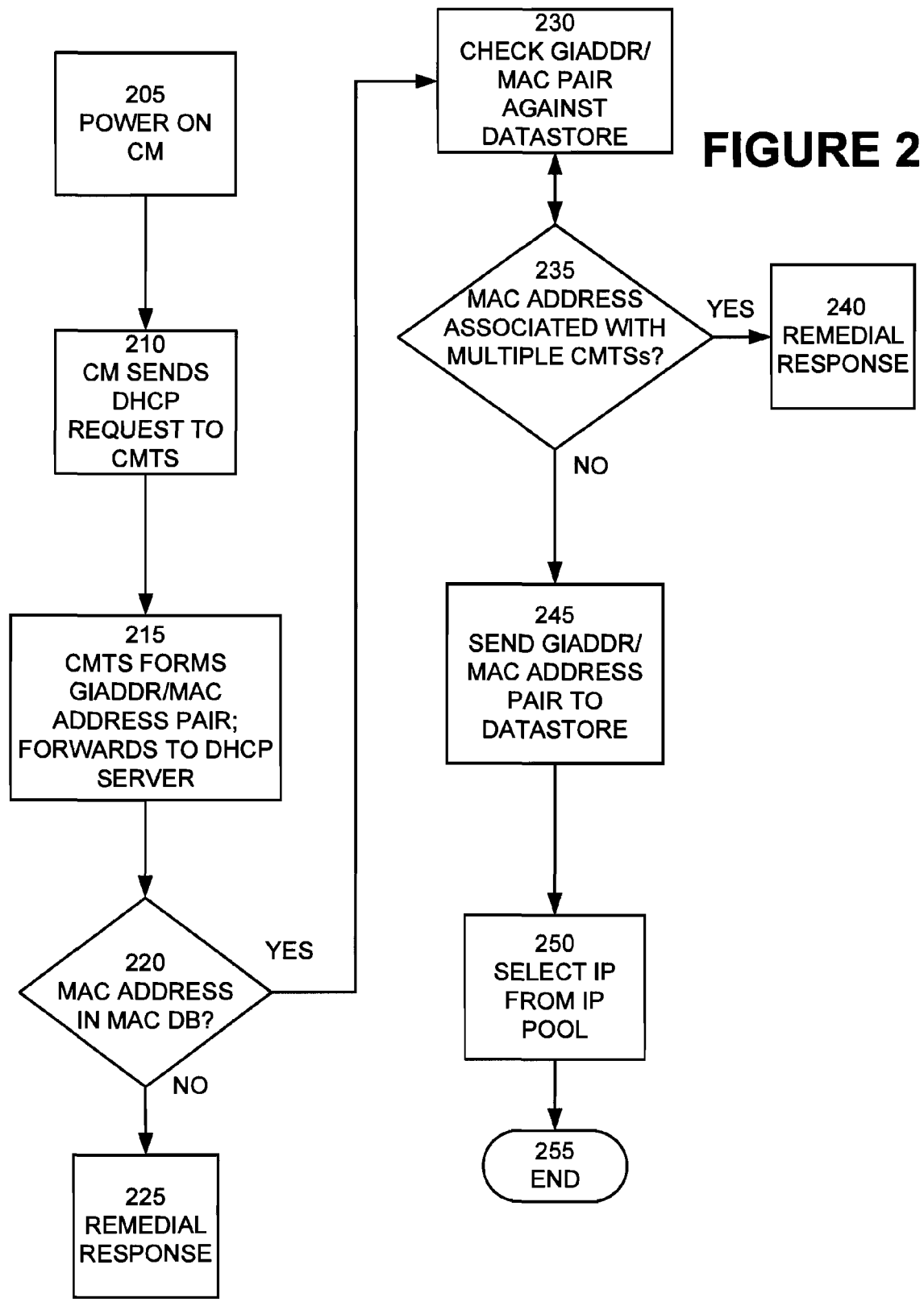
FIG. 2 illustrates a process by which duplicated MAC addresses are detected in a single network with a plurality of CMTSs according to an embodiment.

The functionality of these components is illustrated by FIG. 2. FIG. 2 illustrates a process by which duplicated MAC addresses are detected in a single network with a plurality of CMTSs according to an embodiment. A CM is installed and connected to a cable network. The CM is powered on 205 and sends a DHCP request to the CMTS 210. The CMTS adds a giaddr to the DHCP request and routes the request to a DHCP server 215. The DHCP server determines whether the MAC address is in the MAC database 220. If the MAC address is not in the MAC database 220, remedial response is taken 225. The network administrator determines what is an appropriate remedial response. Typically, where the MAC address is not in the MAC database 220, the user is denied service. However, the invention is not so limited and other actions may be taken (such as continuing to monitor for fraud source and pattern detection) without departing from the scope of the invention.

If the MAC address is in the MAC database 220, the MAC address/giaddr pair data from the CMTS is compared to existing MAC address/giaddr pair data stored in a datastore 230. A determination is made whether the MAC address of the MAC address/giaddr pair data sent from the DHCP server matches a MAC address previously associated with a giaddr 235. If a MAC address has been previously associated with a different giaddr, a remedial response is taken 240. The network administrator determines what is an appropriate remedial response. For example, and not as a limitation, the remedial response comprises denying an IP address to the CM, sending an advisory message to a network administrator, or recording the event in a log file. In yet another embodiment, duplicate MAC addresses are referred to a separate server for processing, thereby relieving the DHCP of the processing burden. In this embodiment, the detection of a duplicate MAC addresses may occur after an IP address has been assigned to both the CM entitled to use the MAC address and to the CM that has pirated the MAC address. An appropriate remedial response is taken to revoke the IP address of the CM using the pirated MAC address.

FIGS. 4A and 4B illustrate another process by which duplicated MAC addresses are detected in a single network with a plurality of CMTSs according to an embodiment illustrated a In this embodiment, the process illustrated in FIG. 2 and discussed above is augmented by associating a CM with an "unlock-until" value along with a giaddr of the CMTS that serves the CM in datastore 230. The unlock-until value is indicative of a period of time after which the CM is locked to a specific CMTS.

Referring to FIG. 4A, during registration of a CM, the DHCP server checks datastore 230 to determine whether a CM has a populated unlock-until attribute 460. If an unlock-until value attribute is present, a determination is made whether the current time is within the change window specified by the unlock-attribute value 465. If the current time is within the change window specified by the unlock-attribute value, the CM will be permitted to register on the network on any CMTS 470. If the unlock-until time window has expired, the DHCP server will update the stored giaddr attribute to contain the CMTS giaddr provided by the CM and remove the unlock-until attribute 475. The CM will be permitted to register 470.

When a CM object has no unlock-until attribute but has a stored giaddr, the DHCP server will compare the current giaddr provided by the CM against the stored giaddr and deny network access if they do not match as previously described and as illustrated in FIG. 4B.

Table 1 summarizes results that flow from the presence and value of giaddr and unlock until attributes in the datastore 230.

| DATASTORE ATTRIBUTES | RESULT |
| --- | --- |
| stored giaddr: <none> unlock-until: <none> | CM is permitted online and stored giaddr is updated to contain giaddr provided by the CM. |
| stored giaddr: populated/<none> unlock-until: time value in the future | CM is permitted online, stored giaddr is ignored |
| stored giaddr: populated/<none> unlock-until: time value in the past | CM is permitted online, stored giaddr is updated to contain giaddr provided by the CM address, unlock-until attribute is removed. |
| stored giaddr: populated with CMTS IP address unlock-until: <none> | CM is permitted online if Giaddr provided by the CM address matches value of stored giaddr. |
| stored giaddr: populated with "any" unlock-until: <none> | Test device, CM is permitted online on any CMTS. |

As indicated in Table 1, a test device may be configured to allow it online via any CMTS.

Figure 3:
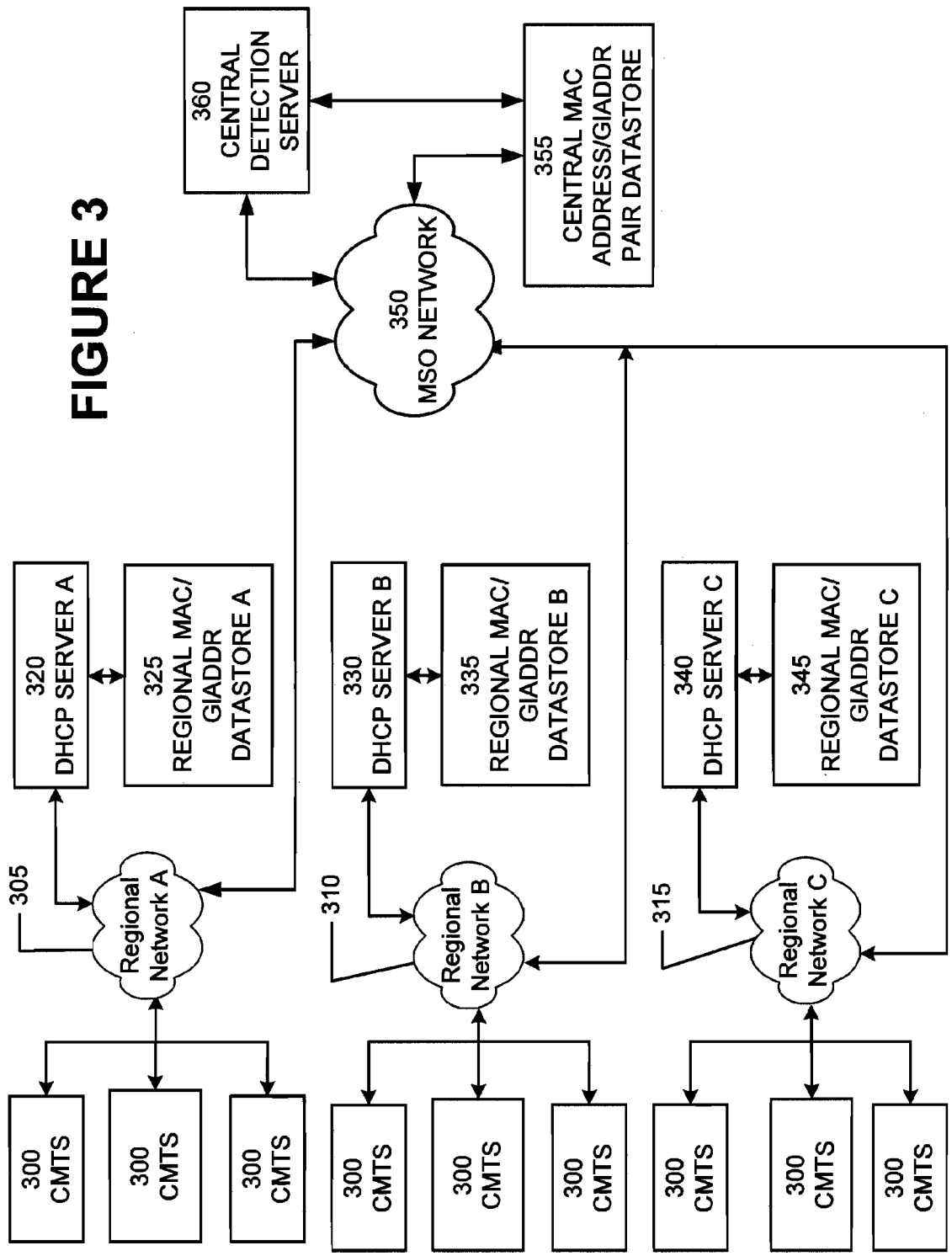
FIG. 3 illustrates an embodiment in which duplicate MAC addresses are detected on a plurality of networks using a plurality of CMTSs.

In another embodiment, a cable system comprising multiple networks is served by a datastore. Referring to FIG. 3, a cable system operated by a multiple system operator (MSO) is illustrated. For clarity, cable modems, customer premises equipment, the MAC address database and the IP address pool (illustrated in FIG. 1) are not shown. Regional network A 305, regional network B 310 and regional network C 315 each are connected to multiple CMTSs 300. While only three regional networks are illustrated, the present invention is not so limited. Any number of regional networks each connected to any number of CMTSs may be served by the present invention without departing from its scope.

Each regional network is connected to a DHCP server that in turn is connected to a regional datastore MAC address/giaddr pair data. As illustrated, regional network A 305 is connected to DHCP server A 320, which is connected to regional MAC address/giaddr datastore A 325. Similarly, regional network B 310 is connected to DHCP server B 330 which is connected to regional MAC address/giaddr datastore B 335, and regional network C 315 is connected to DHCP server A 340 which is connected to regional MAC address/giaddr datastore A 345. Additionally, each regional network is connected to multiple service operator (MSO) network 350. A central MAC address/giaddr datastore 355 is also connected to MSO network 350.

In this embodiment, a CM is serviced by a CMTS connected to a regional network. Within the regional network, the process of checking for MAC address/giaddr pair data is as describe above in reference to FIG. 1. By way of example, each request for a MAC address received by DHCP Server A 320 is passed to the regional MAC address/giaddr datastore A 325. There, the MAC address is checked against previously registered MAC address/giaddr pair data to determine if the MAC address is already associated with a different CMTS.

If CMs with a the same MAC address were to be used on different regional networks, a regional MAC address/giaddr datastore would not have a record of such usage on the other regional network and the duplicate MAC addresses. To detect multiple usage of singular MAC addresses across multiple networks, the MAC address/giaddr pair data from all of the regional networks are forwarded to a central MAC address/giaddr datastore 355. After a request for an IP address received by a DHCP server is handled regionally, the request is sent over the MSO network 350 to central MAC address/giaddr datastore 355 to determine if the MAC address is in use on any of the regional networks comprising the network of the multiple service operator.

In another embodiment, the CM MAC address/giaddr pair data is periodically gathered from the CMTS and the MAC address/giaddr pair data stored in a datastore. In this embodiment, a separate process (disassociated from the DHCP server processes) is used to monitor the MAC address/giaddr pair data in the datastore, identify duplicate MAC addresses, and generate alarms for support personnel. Referring to FIG. 3, a central detection server 360 is linked to a central MAC address/giaddr pair datastore 355. The central detection server 360 performs the separate processes described above.

Figure 5:
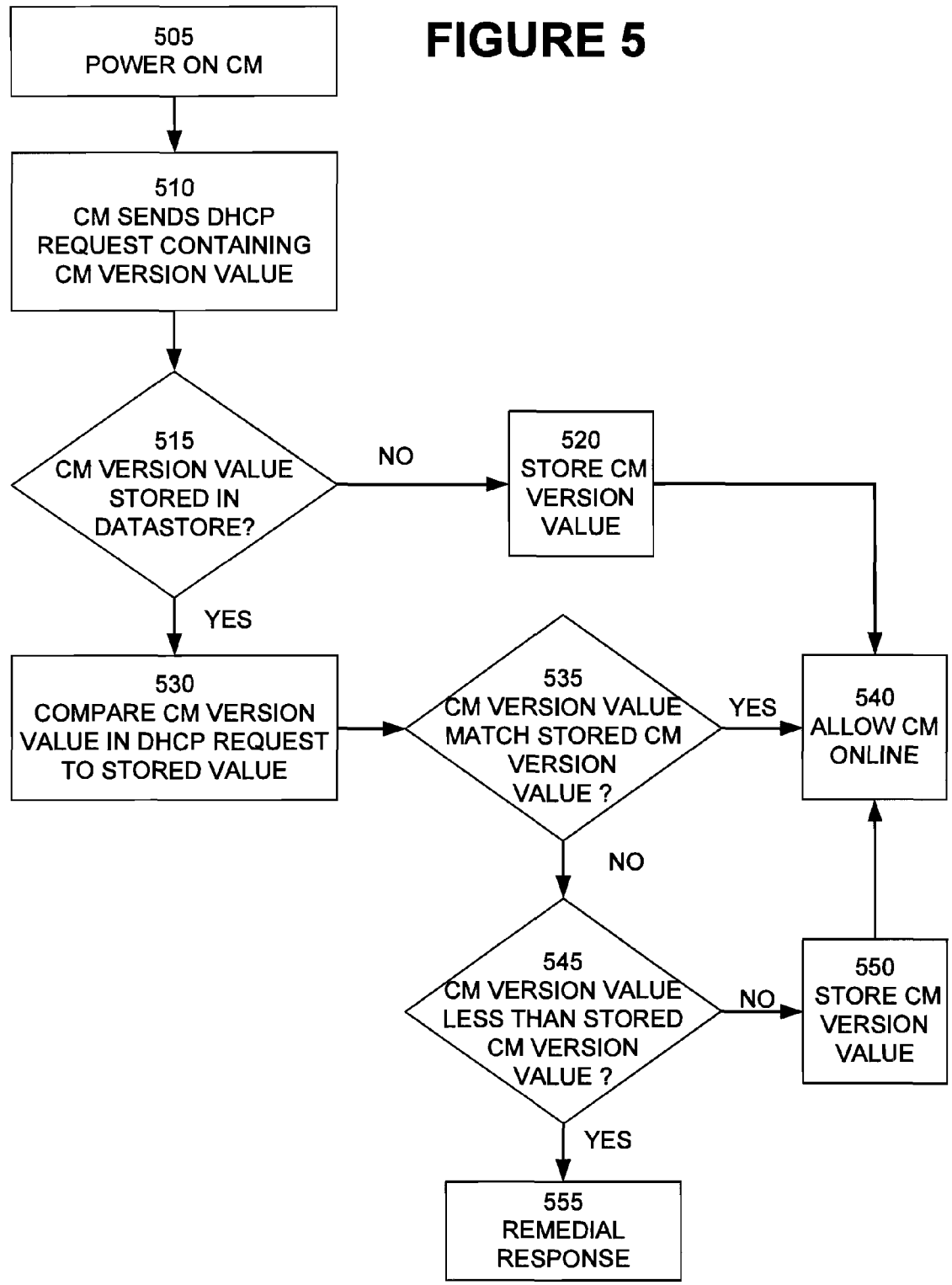
FIG. 5 illustrates a process for identifying a cloned DOCSIS 1.0 CM according to an embodiment.

FIG. 5 illustrates a process for identifying a cloned DOCSIS 1.0 CM according to an embodiment.

A CM is powered on 505 and sends a DHCP request message comprising a CM version value 510. The CM version value is a value that is indicative of the DOCSIS version supported by the CM A DHCP server receives the DHCP request message and determines whether a CM version value has been stored in a datastore 515. If a CM version value is not stored in the datastore, the DHCP server stores the proffered version value included in the DHCP message 520. The CM will then be allowed online 540. If a CM version value is stored in the datastore, the DHCP server will compare the proffered CM version value provided by the CM to a CM version value retrieved from the datastore 530. If the proffered CM version value matches the stored CM version value 535, then CM will be allowed on line 540. If the proffered version value does not match the stored CM version value, a determination is made whether the proffered CM version value is less than the stored CM version value 545. If the proffered CM version value is not less than the stored CM version value, the stored CM version value will be updated with the proffered CM value 550. The CM will be allowed online 540. However, if the stored CM version value is higher than the proffered version value, then remedial action will be taken 555. By way of illustration and not as a limitation, a remedial response may be denying an IP address to the CM, sending an advisory message to a network administrator, or recording the event in a log file.

In another embodiment, if the stored CM version value is indicative of the CM only supporting DOCSIS 1.0, the remedial action is to prohibit the CM from coming online.

It will be understood by those skilled in the art that the present invention may be, without limitation, embodied in other specific forms without departing from the scope of the invention disclosed and that the examples and embodiments described herein are in all respects illustrative and not restrictive. Those skilled in the art of the present invention will recognize that other embodiments using the concepts described herein are also possible. Further, any reference to claim elements in the singular, for example, using the articles "a," "an," or "the" is not to be construed as limiting the element to the singular. Moreover, a reference to a specific time, time interval, and instantiation of scripts or code segments is in all respects illustrative and not limiting.

What is claimed is:

1. A method for mediating access to a cable system by a cable modem comprising:
    receiving at a dynamic host configuration protocol (DHCP) server a DHCP request from a connecting cable modem (CM), wherein the DHCP request comprises a proffered CM version value and a MAC address of the connecting cable modem;
    comparing at the DHCP server the proffered CM version value to a most previously presented value stored in a record associated with the CM MAC address;
    determining by the DHCP server whether the proffered CM version value and the most previously presented value are different;
    taking an action by the DHCP server when the proffered CM version value and the most previously presented value are different, wherein the remedial action is selected from the group consisting of:
        allowing the connecting CM to access the cable system when the proffered CM version value matches the stored CM version value of the record;
        updating the stored CM version value with the proffered CM value and allowing the connecting CM to access the cable system when the proffered CM version value is greater than the stored CM version value of the record;
        taking a remedial response with respect to the connecting CM when the stored CM version value is greater than the proffered version value of the record; and
        storing the proffered CM version value in the CM version value field of the record and allowing the connecting cable modem to access the cable system when the record associated with the CM MAC address does not include a most previously presented value.

2. The method of claim 1, wherein the record is stored in a central database.

3. The method of claim 1, wherein the record is stored in a distributed database.

4. The method of claim 1, wherein the remedial response includes at least one action selected from the group consisting of denying the modem registration with the cable system, sending an advisory message to a network manager, and recording the event in a log file.

5. A system for mediating access to a cable system by a cable modem comprising:
    a record associated with a cable modem (CM) MAC address, wherein the record comprises a CM version value field;
    a dynamic host configuration protocol (DHCP) server device connected to a network comprising instructions for:
        receiving a DHCP request from a connecting CM, wherein the DHCP request comprises a proffered CM version value and a MAC address of the connecting CM;
        comparing at the DHCP server device the proffered CM version value to a most previously presented value stored in the record associated with the CM MAC address;
        determining whether the proffered CM version value and the most previously presented value are different;
        taking an action when the proffered CM version value and the most previously presented value are different, wherein the remedial action is selected from the group consisting of:
            allowing the connecting CM to access the cable system when the proffered CM version value matches the stored CM version value of the record;
            updating the stored CM version value with the proffered CM value and allowing the connecting CM to access the cable system when the proffered CM version value is greater than the stored CM version value of the record;
            taking a remedial response with respect to the connecting CM when the stored CM version value is greater than the proffered version value of the record; and
            storing the proffered CM version value in the CM version value field of the record and allowing the connecting CM to access the cable system when the record associated with the CM MAC address does not include a most previously presented value.

6. The system of claim 5, wherein the record is stored in a central database.

7. The system of claim 5, wherein the record is stored in a distributed database.

8. The system of claim 5, wherein the remedial response includes at least one action selected from the group consisting of denying the connecting modem registration with the cable system, sending an advisory message to a network manager, and recording the event in a log file.

* * * * *